United States Patent [19]

Huber

[11] Patent Number: 4,718,478

[45] Date of Patent: Jan. 12, 1988

[54] PROCEDURE FOR CONTROLLING A THERMAL INSTALLATION

[76] Inventor: Jakob Huber, Les Aveneyres 8, 1806 St.-Legier, Switzerland

[21] Appl. No.: 689,387

[22] Filed: Jan. 7, 1985

[30] Foreign Application Priority Data

Jan. 13, 1984 [CH] Switzerland .................... 172/84

[51] Int. Cl.⁴ ..................... G05D 23/00; G01K 17/06; F24D 3/02
[52] U.S. Cl. ........................ 165/1; 165/11.1; 165/22; 237/8 R; 236/91 F; 236/94; 374/39; 73/861
[58] Field of Search ............... 165/11 R, 22, 1; 237/8 R; 236/94, 9 A, 1 B, 91 F, 36, 37; 374/39, 40, 41; 73/861

[56] References Cited

U.S. PATENT DOCUMENTS

| 2,719,672 | 10/1955 | Jenkins | 236/91 F |
|---|---|---|---|
| 3,144,991 | 8/1964 | Mardrant | 236/91 F |
| 4,049,044 | 9/1977 | Cohen | 165/11 R |
| 4,221,260 | 9/1980 | Otala et al. | 374/39 |
| 4,335,848 | 6/1982 | Eidejus | 236/94 |
| 4,363,441 | 12/1982 | Feinberg | 165/11 R |
| 4,412,647 | 11/1983 | Lampert | 374/39 |
| 4,467,657 | 8/1984 | Olsson | 73/861 |
| 4,509,679 | 4/1985 | Longini | 374/39 |

FOREIGN PATENT DOCUMENTS

| 2358754 | 5/1975 | Fed. Rep. of Germany | 236/91 F |
|---|---|---|---|
| 2722485 | 11/1978 | Fed. Rep. of Germany | 374/40 |
| 2937013 | 4/1981 | Fed. Rep. of Germany | 165/11 R |
| 2377582 | 9/1978 | France | 165/11 R |
| 0889816 | 2/1962 | United Kingdom | 374/39 |

*Primary Examiner*—William R. Cline
*Assistant Examiner*—John K. Ford
*Attorney, Agent, or Firm*—Burns, Doane, Swecker & Mathis

[57] ABSTRACT

A process controlling a thermal installation is described. The flow of a process liquid through a heat exchanger is achieved dependent upon two temperatures. One is the return temperature of the process liquid which, through the switching on and off or modulation of a circulation pump is maintained at a constant value. The other is the room or outside temperatures or the difference between these two temperatures, whereby during the deviation of a predeterminable limiting value the pump is also switched on and off or modulated. Since the supply temperature from a boiler has a constant temperature, for a central heating system the same amount of heat is drawn from each unit of heating water and thus the measure of the pump flow is sufficient to determine the actual heat consumption. Thereby the fair division of heating costs for each tenant according to actual amount consumed is made possible.

12 Claims, 3 Drawing Figures

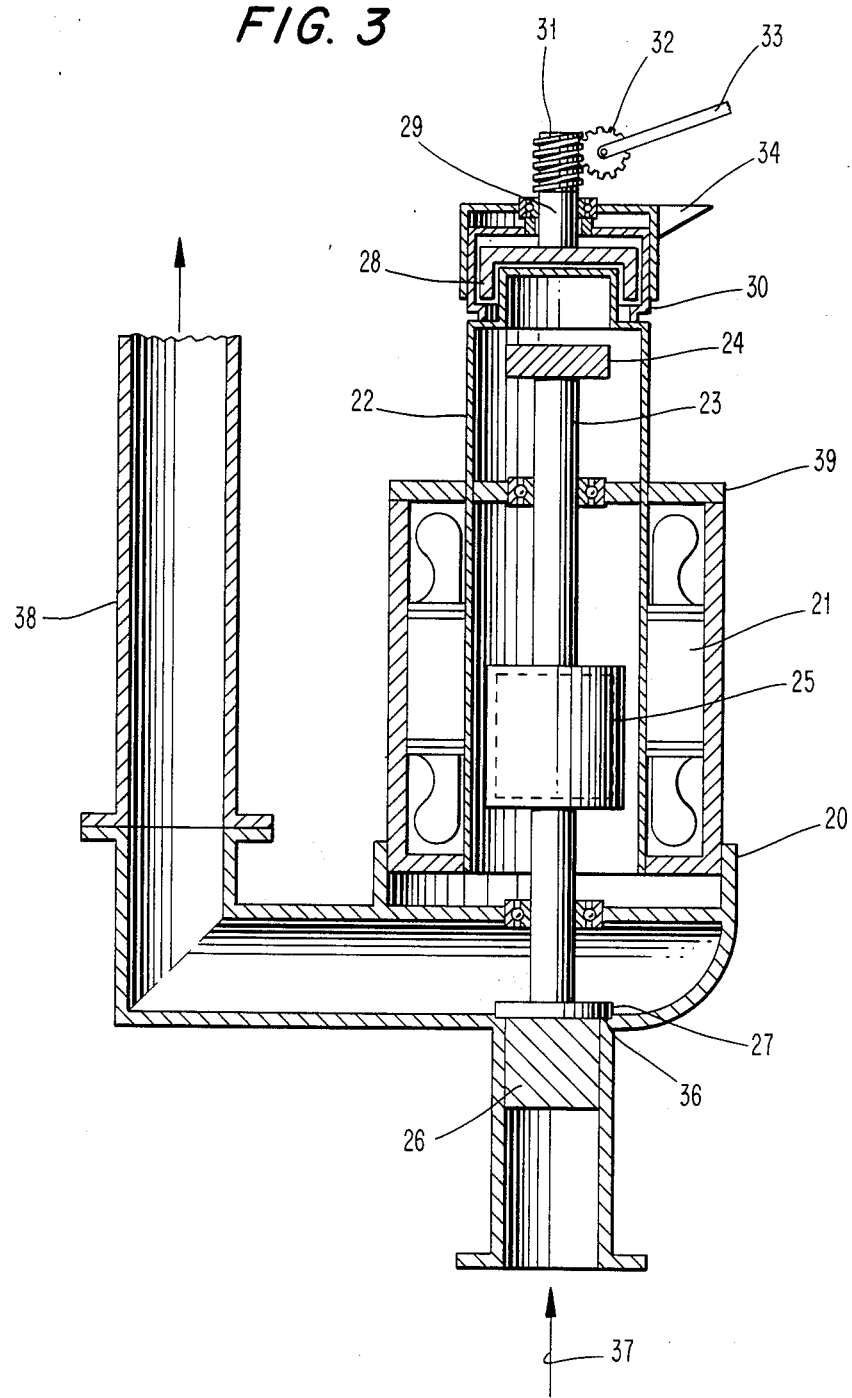

PROCEDURE FOR CONTROLLING A THERMAL INSTALLATION

BACKGROUND OF THE INVENTION

The invention relates to a procedure for controlling a thermal installation which includes at least one thermal regenerator through which a process liquid circulates for the purpose of maintaining an adjustable supply temperature of the process liquid. At least one heat exchanger is provided through which the process liquid flows, connected with the regenerator via a supply pipe and a return pipe, and one circulation pump is provided which is located in one of the two pipes and whose driving motor is part of an electric circuit; furthermore, the invention concerns an arrangement for carrying out this procedure.

Today it is usually customary for the control of a central heating installation to design the oil firing of the boiler with its own boiler thermostat for maintaining a constant feed temperature to the radiators as a system in itself, whereby the process liquid is kept in circulation primarily by a circulation pump.

A room thermostat adjustable to a set temperature in one particular reference room, usually a living room, is selected. The room thermostat controls a butterfly valve or a three-way valve for a residential unit in order to allow the required process liquid to flow through the radiators as soon as the room temperature falls below the set temperatures.

The valves and, depending upon the type of control, the pump are shut off again when the desired temperature is reached or slightly exceeded. These switching procedures can also be activated by other sensors, for example, by an outside thermostat located outdoors that is adjustable to any limiting value desired.

The disadvantage of this and similar controls is that they do not take into account the return temperature of the process fluid which may be high or low. When such a control system is used in an apartment building without having an additional heat counter, it is impossible to divide fairly the heating costs used by the individual tenants.

Disregarding the all inclusive billing of heating cost according to living area which is still customary and which completely ignores the actual consumption of the individual, then the measurement of the flow of heating water pumped through a particular floor or in an apartment is still the best solution at the present time. The disadvantage is, however, that the volume of heating water that has flowed through is measured, not the actual amount of heat consumed, taking into account the temperature in the supply and return pipes.

An improvement in this regard is well know from a central heating installation with a self-regulating flow valve, which by taking into account the temperatures, maintains constant the amount of heating water flowing through. The temperature in the supply and return pipes is measured in a resistance thermometer constructed as a temperature/voltage converter and transmitted to an operational amplifier in which an output signal is formed corresponding to the temperature difference. This is transmitted to a voltage/frequency converter, which generates impulses of different frequencies the number of which is accumulated. This arrangement only has one temperature-dependent measuring device for the amount of liquid carrier through and offers no control possibilities for the operation of the installation. A further disadvantage is the complicated electrical instrumentation that is necessary.

For refrigeration plants, for example, air conditioning in the chemical industry or for the operation of cold storage units, similar situations and requirements exist as with heating installations and thus basically the same demands are placed on an efficient control device.

OBJECTS AND SUMMARY OF THE INVENTION

The object of the invention is a control procedure, and an arrangement for carrying out this procedure, for a thermal installation which permits an economically optimum operation of the installation while simultaneously recording the amount of heat actually converted in the heat exchanger.

In the very simple control system of the invention both the reference value and the return pipe temperature of the process liquid have an influence on the operation of the circulation pump. Accordingly avoidance of unnecessary or excess process liquid pumped through the heat exchanger is achieved. The return pipe temperature is thereby maintained practically constant.

Since it is generally customary to maintain the supply pipe temperature constant as well, the measurement of the entire flow through the pump for a specific time period is sufficient to determine the amount of heat converted in the heat exchanger, which can also be accomplished directly with suitable calibration of the counter.

A further advantage results if the circulation pump can not only be switched on and off but also its speed, and correspondingly the flow rate, varied according to the actual demand. Therefore an even better, and thus more economical, adaptation of the installation to the specific heating or cooling requirements is possible.

Further, it is worthwhile for the circulation pump to be combined with a check valve which automatically stops the flow of the process liquid when the pump is not in operation. An undesired, even if only weak flow, e.g. through the thermosiphon effect, is then no longer possible.

If several independently operating heat exchangers, connected however to either a common drain pipe from or supply pipe to the thermal regenerator, should be controlled, then it is advantageous to provide the control device of the invention for each heat exchanger or each heat exchanger group.

For a central heating installation for an apartment house with several stories, this means a control device for each floor or for each apartment. This permits an exact and reliable accounting of the heating costs and thrifty tenants would no longer have to subsidize the more wasteful.

Based on the attached drawings two illustrative embodiments of the invention and one detailed aspect of it will be described in more detail as follows.

BRIEF DESCRIPTION OF THE DRAWINGS

The drawings illustrate the following:

FIG. 3 is a cross-sectional view of a circulation pump with built-in check valve.

DETAILED DESCRIPTION OF THE EXEMPLARY EMBODIMENTS

Figure 1:
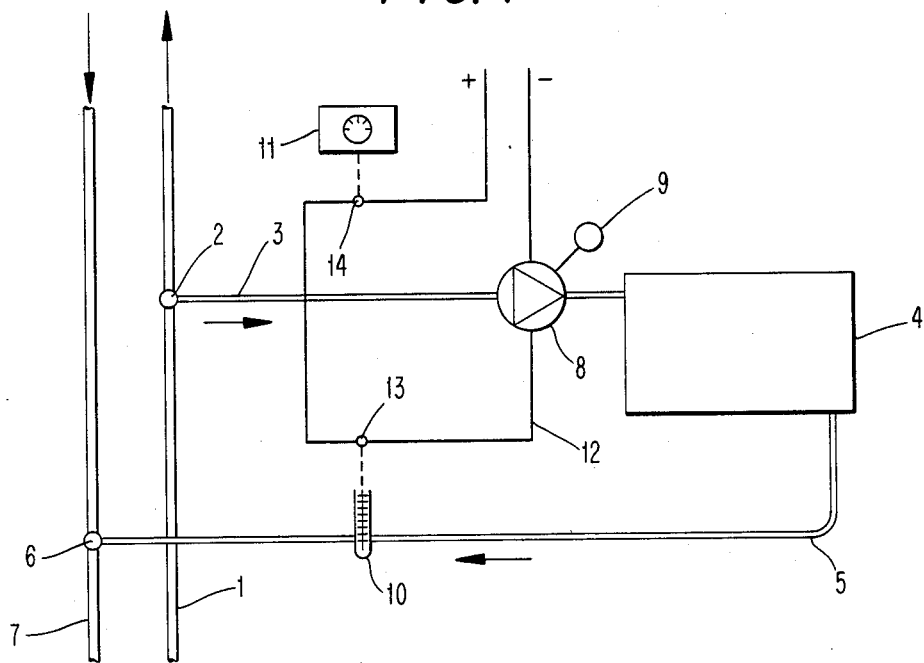
FIG. 1 is a schematic diagram of a control system forming part of a central heating installation.

According to FIG. 1 hot heating water, usually maintained at a constant supply temperature, flows from a central boiler (not shown) through a delivery conduit 1 to the points of use. At point 2, the supply pipe 3 branches off leading to a heat exchanger 4—a single radiator or to a group of radiators—distributed over several rooms. The return pipe 5 leads from heat exchanger 4 and at point 6 joins the drain conduit 7 which leads back to the central boiler.

In the supply pipe 3 is a circulation pump 8 which may be integral or separate from a counter 9. In the return pipe 5 is a first temperature sensor 10, e.g. a resistance thermometer or a bimetallic element. A second temperature sensor 11 in the form of a room thermostat is located in the reference room—usually one of the heated rooms. The circulation pump 8 is part of the electric circuit 12 with which the two temperature sensors 10 and 11 are also connected functionally via the two switching positions 13 and 14 in a basically well-known manner.

The temperature in the reference room is the reference value for which a comparison or limiting value, in this case the desired set value of the room temperature, is set on the thermostat. As soon as the set value exceeds the actual value of the room temperature through heating of the room, the second temperature sensor 11, i.e., the room thermostat, interrupts the electric circuit 12 at the second switching position 14 and the circulation pump 8 is thus switched off. If the room temperature drops below the set value, then the room thermostat closes the electric circuit and the pump can again function. This control procedure is known both from heating as well as by analogy cooling technologies.

Despite this control mechanism there results, apart from other considerations from the sluggishness inherent in the system, a certain fluctuation of the actual value of the room temperature about the selected set value. In case of normal room heating, for example, temperature variations of $\pm\frac{1}{2}°$ C. are acceptable. Only when these tolerance limits are reached do the switching procedures occur. If narrower tolerance limits are necessary, e.g. in laboratories, this can be achieved without difficulty through appropriate instrumentation.

A further and similar control procedure is superimposed on the one described whereby also the heating water temperature in the return pipe 5 is measured and included in the control procedure. A desired set value of the return temperature is selected at the temperature sensor 10. As soon as the actual temperature of the return temperature exceeds the selected set value, the electric circuit 12 at switching position 13 is interrupted and the circulation pump stops. If the actual value drops below the set value, then the temperature sensor 10 closes the electric circuit at switching position 13 and the pump starts operating again, of course, only under the condition that the electric circuit is also closed at switching position 14.

It should be noted at this point that normally the pump can operate only when the electric circuit is closed at both switching positions. Whereas opening only one position suffices in order to interrupt the electric circuit and shut off the pump. As the set value for the return temperature, a value is chosen which, for example, is 10° C. lower than that of the supply from the boiler which is usually held constant. Also in this case a certain tolerance limit must be allowed for deviations of the actual value from the set value before a switching procedure is activated. If, however, for some reason greater fluctuations in the supply temperature are anticipated, then it is advisable to set the return temperature at a constant difference below the supply temperature, for which, of course, an additional device is necessary to form the difference.

By including the return temperature in the control procedure the flow through the radiator is controlled in such a way that—discounting short transition periods, for example, during start-up of the installation—the same amount of heat is always drawn from one unit of the heating water fed in. This applies to all the tenants of a building with a central heating installation and thus permits the fair division of the heating costs according to the actual amount used.

The measurement of a single value is sufficient, namely, the through-flow through the radiator or, what amounts to the same thing, the delivery capacity of the pump.

For this purpose the circulation pump 8 is fitted with a counter 9, which sums the number of turns, the flow amount, or in case of simple installations the operating hours of the circulation pump and thus supplies a measure of the converted units of heat in the heat exchanger. The counter can, however, be adjusted to measure units of heat directly.

If, however, the supply temperature is subject to frequent or larger fluctuations, it is then advantageous to drive a calorie counter directly, by means of a magnetic coupling of the circulation pump, which records the difference between the supply and return temperatures for determining the amount of heat consumed.

In order to avoid, when the circulation pump has stopped, an undesired, even if only a very small amount of flow through the heating system, which would lead to heat consumption that could not be measured, it is advantageous to cut off the flow at the same time when shutting off the pump. A design example of a unit with these characteristics is shown in FIG. 3.

A further advantage results if the room thermostat is connected to a time switch, whereby, e.g. the room temperature can be lowered at night or some other time/temperature program can be regulated.

The same control scheme according to FIG. 1 is also applicable if the outside temperature is chosen as the reference value. In this case an outdoor thermostat is used as the second temperature sensor 11 on which the desired limiting value is selected. If the outside temperature drops below this limiting value the thermostat closes the electric circuit 12 at switching position 14 and the circulation pump 8 begins to operate insofar as the switching position 13 is closed. If the outside temperature exceeds the set limiting value, the electric circuit is interrupted at 11 and the pump stops.

An additional possibility is to choose the difference between the set value of the room temperature and the outside temperature as the reference value. In this case it is advantageous to regulate the speed of the circulation pump as a function of this temperature difference, e.g. with the aid of an electronic speed-control device.

With such a control system the pump operates at full speed only when the atmosphere is very cold and there is a corresponding heat demand. It is then regulated is such a way that the return temperature of the heating water maintains the desired difference from the supply temperature. Of course, the temperature difference between the actual and set values of the room temperature, or between the outside temperature and the set value of the room temperature, or also the difference between the supply and return temperatures can also be chosen as the reference value.

As the actual temperature approaches the desired room temperature, the pump turns slower and slower until the set value is reached, as described above, when through the interruption of the electric circuit, it is completely shut off. The advantage of this control procedure is that the heating of the room can be better adapted to the particular heating needs and thus leads to lower radiator temperatures. Heating no longer occurs intermittently at the maximum rate, but with gradual transitions, which contributes to the well-being of the occupants of the room. Further, at lower rotational speeds a very undisturbed and thus silent operation of the pump can be achieved.

In an analogous manner, for refrigeration units the same types of control devices are applicable, whereby for comparable temperature changes the reverse switching procedures occur. A coolant flows through the entire system according to FIG. 1, taken from the supply pipe 1 and subsequently returned to the drain pipe 7. The heat exchanger 4 does not supply heat but draws heat from the surrounding air and transmits it to the coolant whereby the room is cooled.

The inside temperature of a reference room, whose limiting value, in this case the desired set value, is selected at the second temperature sensor, a room thermostat, again serves as a reference value. As soon as the actual value of the room temperature exceeds the set value through heating, the room thermostat closes the electric circuit 12 at the second switching position 14 and the circulation pump 8 begins to operate. If the room temperature falls below the selected set value, the electric circuit is opened at the switching position and the pump stops.

A set value is selected a the first temperature sensor 10 in the return pipe 5 as well, for example, 10° C. above the supply temperature.

As soon as the actual value of the return temperature exceeds the set value, the temperature sensor 10 closes the electric circuit 12 at the first switching position 13 and the pump 8 begins to operate. If the actual value falls below the set value, the circuit opens at switching position 13 and the pump stops.

The room thermostat can also be replaced by an outdoor thermostat for refrigeration units, whereby the rapid registration of changes in the external temperature is of greater importance here than for heating installations. Likewise, the speed regulator for the circulation pump can be used to advantage.

Figure 2:
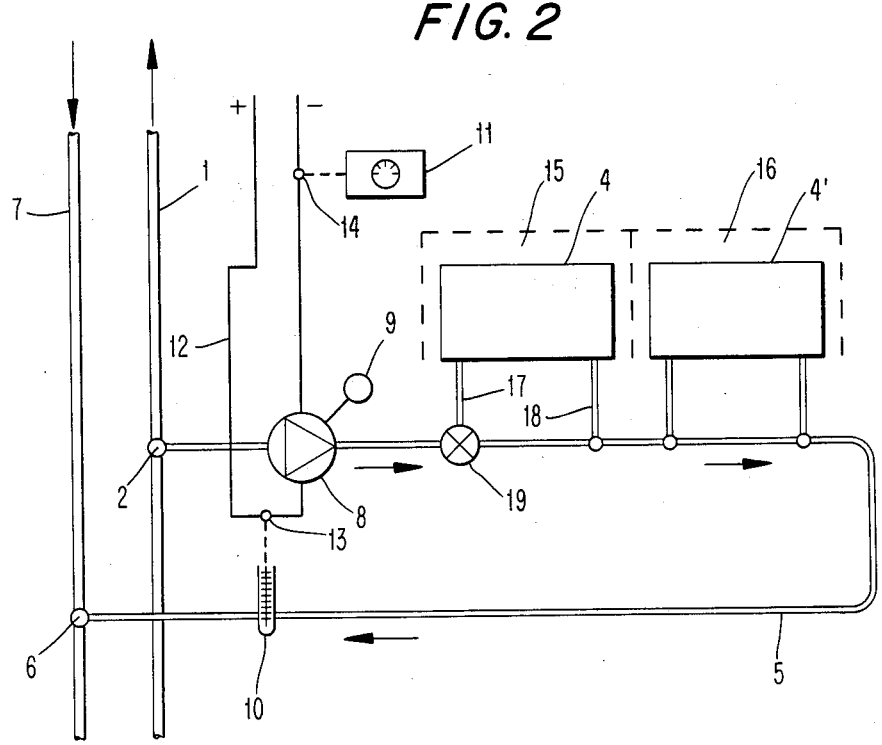
FIG. 2 is a variation of FIG. 1 for a different heating installation.

A variant of the control scheme according to FIG. 1 which results in the control of a single-pipe system is shown in FIG. 2. The same elements in both figures are indicated with the same reference numbers. The supply pipe 3 and the return pipe 5 are joined together to form a single pipeline with which heat exchangers 4,4', located in two separate rooms 15, 16 are connected via supply pipe 17 and return pipe 18 in such a way that a partial flow of the process liquid flows through.

Again, in this control scheme, the circulation pump 8 is part of the electric circuit 12; however, only one switching position 13 is planned which, as described previously, is opened and closed by the first temperature sensor 10 and thereby the pump is activated or switched off. The temperature sensor 10 is located in the return part 5 of the single pipeline. The room temperature as a reference value for the control arrangement directly influences a water divider 19, forming a throttling device, which is located at the branching point of the supply pipe 17 from the supply pipe 3 and in which a second temperature sensor (not show in figure) is integrated.

In heating installations, such water dividers are well known as automatic radiator valves and are available commercially. As a function of the reference value the flow through the divider 19 and thus through the radiator is more or less throttled. If the room temperature falls far below the set temperature, adjustable at the divider, it is completely open; with increasing room temperature the cross-sectional area of the opening decreases, closing completely as soon as the room temperature reaches the set value. With decreasing room temperature the process is reversed. The water divider 19 opens and allows flow until the room temperature has again reached the set value.

If, in the case of a single-pipe system, night switching should take place to lower the room temperature, then the room thermostat 11 is added, which is connected to a time switch and which is functionally connected with the electric circuit 12 at switching position 14. During the day it is set higher than the set value of the room temperature, the circuit is thus closed at that position and control results in the manner described above. However for the night, the room thermostat is switched to a lower set value of the room temperature. As a result it interrupts the circuit at the room temperature set for daytime and closes it only when the room temperature falls below the new set value whereby the circulation pump is activated again. Thus during the night this control procedure supersedes the other control procedure without it having to be changed. In principle, it is sufficient if there is only one water divider in a room. The other radiators can be connected in series. It should also be mentioned that also with a single-pipe heating system speed control of the circulation pump as described for FIG. 1 can be provided.

Similarly the single-pipe system can be used for refrigeration plants, although the reference value must influence the throttle device in the opposite way. It must open when the room temperature increases and close again as soon as the room temperature decreases. Similarly the temperature sonsor in the return pipe must close the electric circuit at the switching position when the return temperature of the coolant exceeds the selected set value, and open the circuit again when it falls below the set value.

In the arrangement shown in FIG. 3 the circulation pump, the driving motor and the check valve form a modular unit. The stator 21 of the driving motor is housed in the multisectional housing 20, which is protected from the process liquid by a jacket 22. The axially movable rotor, which is shown in the closed position, includes a two-bearing shaft 23 upon which are mounted a permanent magnet 24, the rotor 25 of a driving motor and the pump wheel 26 of the pump unit the end of which is constructed to act as a valve 27.

The jacket 22 extends beyond the housing 20 and also encloses the magnet 24. The upper part of the jacket, adapted to the dimensions of the magnet, is surrounded by a bracket 28 which is mounted with a pin 29 in a rotatable manner in a holder 30. The end of the pin is constructed as a worm gear 31 which is connected to a counter (not shown) through the toothed wheel 32 and the lever 33. The rotatable rotation indicator 34 is located on the holder 30.

When the electric current is switched on the rotor 25 is drawn into the magnetic field of the stator 21 and thus the rotor is lifted whereby it begins to rotate. The valve disk 27 lifts off the seat 36 in the housing 20 and provides a passage for the process liquid which then flows in the direction of the arrow 37 and is pumped by the pump wheel 26 under pressure into the pipe 38, e.g. into the supply pipe of the associated installation.

The magnet 24 and the bracket 28, functioning as a puller, form a magnetic coupling. As soon as the magnet is lifted and begins to rotate the puller also operates synchronously and actuates the counter which adds the pump turns, the throughflow or the operating hours, or it can also indicate directly the amount of calories converted in the installation.

At the same time the rotation indicator 34, influenced by the magnetic coupling, is moved to an end stop. Its purpose is simply to check whether the pump motor runs in the correct direction of rotation, which, of course, is a necessary prerequisite for pumping the process liquid.

As soon as the current is interrupted, the rotor stops and falls down under gravity. The valve disk 27 contacts the valve seat 36, shuts off the flow of the process liquid and the counter stops.

If the pump should also be driven with the shaft 23 not vertical, but for example, in a horizontal position, it is sufficient, for example, to install a spiral spring within the jacket 22 between the rotor 25 and the casing cover 39. The spring should be designed in such a way that it provides for the reliable closing movement of the valve disk when the current is interrupted, yet does not produce too large a resistance against the movement of the rotor 25 in the magnetic field of the stator 21 when the current is switched on.

For the sake of completeness it should also be mentioned that the procedure described based on FIGS. 1 and 2 can, of course, be carried out with separate components, i.e. with pump, driving motor, and check valve.

What is claimed:

1. In a process for controlling the circulation of a heat exchange fluid through a fluid delivery conduit from thermal regenerating means to a plurality of separate apartments; each of said apartments provided with heat exchange means, a fluid supply pipe interconnecting said delivery conduit and an inlet of said heat exchange means, a return pipe fluidly interconnecting an outlet of said heat exchange means with a common return conduit for returning fluid to said regenerating means, a fluid circulation pump located in one of said supply and return pipes for circulating fluid through said heat exchange means, and a motor for driving said pump, said process including the step of independently controlling the circulation of heat exchange fluid in each of said apartments, the improvement comprising independently measuring the heat transferred in said heat exchange means of each apartment by the steps of:

sensing the temperature of fluid in said return pipe and controlling said pump to restrict the flow of fluid through said heat exchange means if the sensed temperature of fluid in said return pipe deviates from a first set point, maintaining a selected substantially constant temperature difference between the flowing fluid in said supply and return pipes independently of temperature conditions inside and outside said apartment, providing a temperature-dependent value obtained independently of the temperatures in said supply and return pipes and controlling said pump to restrict the flow of fluid through said heat exchange means if said temperature-dependent value deviates from a second set point, and obtaining a measurement of the amount of heat transferred by said heat exchange means by measuring the amount of fluid circulating through said heat exchange means independently of the amounts of fluid circulating through the heat exchange means of the remaining apartments.

2. A process according to claim 1, wherein said fluid is a heating fluid, the flow of fluid through said heat exchange means being restricted whenever the temperature of fluid in said return pipe exceeds said first set point, or said temperature dependent value exceeds said second set point.

3. A process according to claim 1, wherein said fluid is a cooling fluid, the flow of fluid through said heat exchange means being restricted whenever the temperature of fluid in said return pipe falls below said first set point, or said temperature dependent value falls below said first set point.

4. A process according to claim 1, wherein said temperature dependent value is obtained by sensing a temperature in the respective apartment.

5. A process according to claim 1, wherein said temperature dependent value is obtained by sensing a temperature outside of the respective apartment.

6. A process according to claim 1, wherein said temperature dependent value comprises a differential between temperatures sensed within and outside of the respective apartment.

7. A process according to claim 1, wherein the flow of fluid to said heat exchange means is restricted by being completely interrupted by opening an electrical circuit controlling said pump motor to terminate operation thereof.

8. A process according to claim 1, wherein said pump motor is disposed in an electrical circuit containing two independently operable switches each for opening and closing the circuit, and further wherein one of said switches is actuated in response to said temperature-dependent value deviating from said second set point, and the other switch being actuated in response to the temperature of fluid in said return pipe deviating from said first set point.

9. A process according to claim 1, wherein said measuring step comprises measuring the number of turns of said pump.

10. A process according to claim 1 including the steps of:

unrestricting the flow of fluid through said heat exchange means if the sensed temperature of fluid in said return pipe deviates from said first set point in a direction of deviation opposite a direction of deviation which produces the restriction in flow, and unrestricting the flow of fluid through said heat exchange means if said temperature-dependent value deviates from a second set point in a direction of deviation opposite a direction of deviation which produces the restricted flow.

11. A process according to claim 1, wherein said first and second set points can be varied.

12. A process according to claim 1 wherein said flow is restricted by reducing the speed of said pump.

* * * * *